United States Patent [19]
Barth et al.

[11] Patent Number: 5,765,020
[45] Date of Patent: Jun. 9, 1998

[54] METHOD OF TRANSFERRING DATA BY TRANSMITTING LOWER ORDER AND UPPER ODERMEMORY ADDRESS BITS IN SEPARATE WORDS WITH RESPECTIVE OP CODES AND START INFORMATION

[75] Inventors: Richard Maurice Barth, Palo Alto; Matthew Murdy Griffin, Mountain View; Frederick Abbott Ware, Los Altos; Mark Alan Horowitz, Palo Alto, all of Calif.

[73] Assignee: Rambus, Inc., Mountain View, Calif.

[21] Appl. No.: 784,464

[22] Filed: Jan. 16, 1997

Related U.S. Application Data

[63] Continuation of Ser. No. 667,293, Jun. 19, 1996, abandoned, which is a continuation of Ser. No. 484,917, Jun. 7, 1995, abandoned, which is a division of Ser. No. 381,015, Jan. 30, 1995, abandoned, which is a continuation of Ser. No. 848,421, Mar. 6, 1992, abandoned.

[51] Int. Cl.$^6$ .................................................. G06F 13/00
[52] U.S. Cl. ............. 395/823; 340/825.06; 340/825.07; 340/825.52; 395/200.16; 395/200.17; 395/824; 395/850
[58] Field of Search ............ 340/825.06, 825.07, 340/825.52; 395/200.16, 200.17, 308, 410, 421.01, 823–824, 850, 846–847

[56] References Cited

U.S. PATENT DOCUMENTS

| | | | |
|---|---|---|---|
| 4,247,817 | 1/1981 | Heller | 324/73 R |
| 4,481,625 | 11/1984 | Roberts et al. | 370/85 |
| 4,519,034 | 5/1985 | Smith et al. | 364/200 |
| 4,523,274 | 6/1985 | Fukunaga et al. | 395/325 |
| 4,539,677 | 9/1985 | Lo | 370/85 |
| 4,630,264 | 12/1986 | Wah et al. | 370/85.3 |
| 4,658,250 | 4/1987 | Nering et al. | 340/825.5 |
| 4,701,909 | 10/1987 | Kavehrad et al. | 370/85 |
| 4,751,701 | 6/1988 | Roos et al. | 370/85.3 |
| 4,785,394 | 11/1988 | Fischer | 364/200 |
| 4,785,396 | 11/1988 | Murphy et al. | 364/200 |
| 4,809,264 | 2/1989 | Abraham et al. | 370/76 |

(List continued on next page.)

FOREIGN PATENT DOCUMENTS 9102590  4/1991  WIPO .

OTHER PUBLICATIONS

Martin, J. "Local Area Networks: Architectures and Implementations", pp. 33, 84–88, USA, Prentice-Hall, (1989).
Martin, J. "Local Area Networks: Architectures and Implementations", pp. 87, 223–224, USA, Prentice-Hall, (1989).
Gumm, Steve L. and Carl T. Dreher, "Unraveling the Intricacies of Dynamic RAM's", pp. 155–165 Electronic Design News, (Mar. 30, 1989).

*Primary Examiner*—Lance Leonard Barry
*Attorney, Agent, or Firm*—Blakely, Sokoloff, Taylor & Zafman LLP

[57] ABSTRACT

A high speed bus system in which at least one master device, such as a processor and at least one DRAM slave device are coupled to the bus. An innovative packet format and device interface which utilizes a plurality of time and space saving features in order to decrease the die size of the device receiver and decrease the overall latency on the bus is provided. In the preferred embodiment the request packet is transmitted on ten multiplexed transmission lines, identified as BusCtl and BusData [8:0]. The packet is transmitted over six sequential bus cycles, wherein during each bus cycle, a different portion of the packet is transmitted. The lower order address bits are moved ahead of the higher order address bits of the memory request. This enables the receiving device to process the memory request faster as the locality of the memory reference with respect to previous references can be immediately determined and page mode accesses on the DRAM can be initiated as quickly as possible. The type of memory access is arranged over a plurality of clock cycles, placing the more critical bits first. The count of blocks of data requested is arranged to minimize the number of bit positions in the packet used and therefore the number of transmission lines of the bus and the number of bus receiver contacts on the receiving device.

11 Claims, 7 Drawing Sheets

U.S. PATENT DOCUMENTS

| | | | |
|---|---|---|---|
| 4,811,202 | 3/1989 | Schabowski | 364/200 |
| 4,845,663 | 7/1989 | Brown et al. | 364/900 |
| 4,860,198 | 8/1989 | Takenaka | 364/200 |
| 4,912,627 | 3/1990 | Ashkin et al. | 364/200 |
| 4,929,940 | 5/1990 | Franaszek et al. | 340/825.2 |
| 4,959,829 | 9/1990 | Griesing | 370/85.3 |
| 5,012,467 | 4/1991 | Crane | 370/85.3 |
| 5,048,009 | 9/1991 | Conrad | 370/17 |
| 5,063,612 | 11/1991 | Mc Keown | 455/607 |
| 5,124,982 | 6/1992 | Kaku | 370/85.3 |
| 5,272,700 | 12/1993 | Hansen et al. | 370/85.3 |
| 5,301,303 | 4/1994 | Abraham et al. | 395/500 |
| 5,311,172 | 5/1994 | Sadamori | 340/825.5 |
| 5,319,755 | 6/1994 | Farmwald et al. | 395/284 |
| 5,339,307 | 8/1994 | Curtis | 370/13.1 |
| 5,383,185 | 1/1995 | Armbruster et al. | 370/85.3 |
| 5,408,129 | 4/1995 | Farmwald et al. | 257/692 |

FIG. 5a
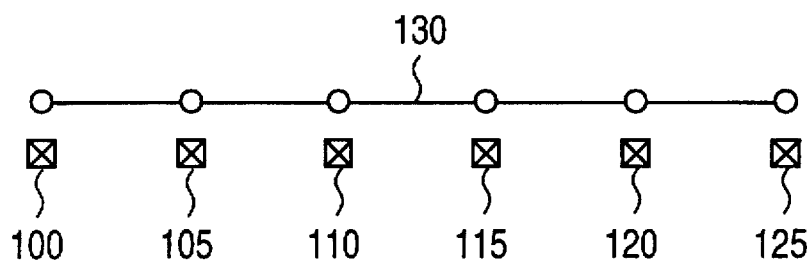
100  105  110  115  120  125
FIG. 5b
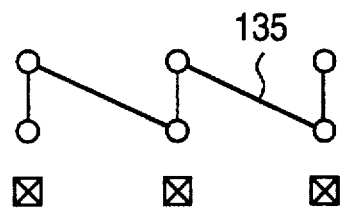
FIG. 6a
| Adr[1:0] | Mask[3:0] |
|---|---|
| 00 | 1111 |
| 01 | 1110 |
| 10 | 1100 |
| 11 | 1000 |
FIG. 6b
| Count[1:0] | Mask[7:4] |
|---|---|
| 00 | 0001 |
| 01 | 0011 |
| 10 | 0111 |
| 11 | 1111 |

FIG. 7a

One Byte Transfer (MasterCount[7:0] = 00000000)

| Count[7:2] | Count[1:0] | Adr[1:0] | Mask[7:4] | Mask[3:0] | Mask[7:4] and Mask[3:0] |
|---|---|---|---|---|---|
| 000000 | 00 | 00 | 0001 | 1111 | 0001 |
| 000000 | 01 | 01 | 0011 | 1110 | 0010 |
| 000000 | 10 | 10 | 0111 | 1100 | 0100 |
| 000000 | 11 | 11 | 1111 | 1000 | 1000 |

FIG. 7b

Two Byte Transfer (MasterCount[7:0] = 00000001)

| Count[7:2] | Count[1:0] | Adr[1:0] | Mask[7:4] | Mask[3:0] | Mask[7:4] and Mask[3:0] |
|---|---|---|---|---|---|
| 000000 | 01 | 00 | 0011 | 1111 | 0011 |
| 000000 | 10 | 01 | 0111 | 1110 | 0110 |
| 000000 | 11 | 10 | 1111 | 1100 | 1100 |
| 000001 | 00 | 11 | 0001 | 1000 | not used-two QB's |

FIG. 7c

Four Byte Transfer (MasterCount[7:0] = 00000011)

| Count[7:2] | Count[1:0] | Adr[1:0] | Mask[7:4] | Mask[3:0] | Mask[7:4] and Mask[3:0] |
|---|---|---|---|---|---|
| 000000 | 11 | 00 | 1111 | 1111 | 1111 |
| 000001 | 00 | 01 | 0001 | 1110 | not used-two QB's |
| 000001 | 01 | 10 | 0011 | 1100 | not used-two QB's |
| 000001 | 10 | 11 | 0111 | 1000 | not used-two QB's |

FIG. 7d

Eight Byte Transfer (MasterCount[7:0] = 00000111)

| Count[7:2] | Count[1:0] | Adr[1:0] | Mask[7:4] | Mask[3:0] | Mask[7:4] and Mask[3:0] |
|---|---|---|---|---|---|
| 000001 | 11 | 00 | 1111 | 1111 | not used-two QB's |
| 000010 | 00 | 01 | 0001 | 1110 | not used-three QB's |
| 000010 | 01 | 10 | 0011 | 1100 | not used-three QB's |
| 000010 | 10 | 11 | 0111 | 1000 | not used-three QB's |

METHOD OF TRANSFERRING DATA BY TRANSMITTING LOWER ORDER AND UPPER ODERMEMORY ADDRESS BITS IN SEPARATE WORDS WITH RESPECTIVE OP CODES AND START INFORMATION

This is a continuation of application Ser. No. 08/667,293, filed Jun. 19, 1996, now abandoned, which is a continuation of application Ser. No. 08/484,917, filed Jun. 7, 1995 now abandoned, which is a divisional of application Ser. No. 08/381,015, filed Jan. 30, 1995 now abandoned, which is a continuation of application Ser. No. 07/848,421, filed Mar. 6, 1992 now abandoned.

BACKGROUND OF THE INVENTION

1. Field of the Invention

The present invention relates to the transmission of data between devices coupled to a high speed bus system. More particularly, the present invention relates to the packet format transmitted across a high speed bus system and the processing of the same by devices coupled to the bus.

2. Art Background

A computer bus is utilized for communication of information among master and slave devices coupled to the bus. Generally, a bus comprises a plurality of transmission lines to which the devices are coupled. Address, control, and data information are multiplexed over the transmission lines forming the bus. The information is communicated across the bus in many different formats. One such format is a packet format in which data is bundled in packets for transmission on the bus across multiple clock cycles. An example of a bus which utilizes packets is described in PCT international patent application number PCT/US91/02590 filed Apr. 16, 1991, published Oct. 31, 1991, and entitled *Integrated Circuit I/O Using a High Performance Bus Interface*.

An example of a packet issued by a requesting device is illustrated in FIG. 1. Using bus lines BusCtl and BusData [7:0], in the first bus cycle the type of bus access and the master device (i.e., requesting device) is provided. In the second through sixth bus cycles the address of the requested data and the block size are provided.

However, as the speed of transmission of information on the bus increases, the speed required of the receiving devices to process the packet needs to also increase in order to reduce the latency and realize the advantages of the increased speed of transmission across the bus. Furthermore, it is desirable to decrease the die space consumed while maintaining full functionability at the bus interface.

SUMMARY AND OBJECTS OF THE INVENTION

It is therefore an object of the present invention to provide a packet format which enables the receiving device to decrease the latency when the packet is processed.

It is an object of the present invention to provide a packet format which enables a receiving device to initiate access operations as quickly as possible based upon the address provided in the packet.

It is an object of the present invention to increase the speed for determining packet collisions on the bus and notifying devices of the occurrence of the same.

It is further an object of the present invention to provide a packet format for transmission across a high speed bus in which the block size decoding at the receiving device is simplified thereby increasing the speed at which the receiving device processes the information.

It is an object of the present invention to provide a packet format for transmission on a high speed bus which enables the die space consumed on the device receivers to be reduced.

A high speed bus system in which at least one master device, such as a processor, and at least one DRAM slave device are coupled to the bus. An innovative packet format and device interface which utilizes a plurality of time and space saving features in order to decrease the die size of the device receiver and decrease the overall latency on the bus is provided. In the preferred embodiment the request packet is transmitted on ten multiplexed transmission lines, identified as BusCtl and BusData [8:0]. The packet is transmitted over six sequential bus cycles, wherein during each bus cycle, a different portion of the packet is transmitted. The lower order address bits are moved ahead of the higher order address bits of the memory request. This enables the receiving device to process the memory request faster as the locality of the memory reference with respect to previous references can be immediately determined and page mode accesses on the DRAM can be initiated as quickly as possible. The type of memory access is arranged over a plurality of clock cycles; placing the more critical bits first. The count of blocks of data requested is arranged to minimize the number of bit positions in the packet used and therefore the number of transmission lines of the bus and the number of bus receiver contacts on the receiving device. This helps minimize the amount of die space required on the chip to process the block count information. The number of blocks is encoded in a manner to decrease the die space consumed in the receiver as well as to simplify the decoding by the receiver, thereby increasing the speed along critical paths and decreasing latency during the processing of the request packet.

BRIEF DESCRIPTION OF THE DRAWINGS

The objects features and advantages of the present invention will become apparent to one skilled in the art when reading the following detailed description in which:

FIG. 5a and FIG. 5b illustrate the decrease in length of the carry chain by organization of the information in the packet format.

FIGS. 6a and 6b illustrate the innovative encoding of bits for generation of byte masks utilized.

FIGS. 7a, 7b, 7c and 7d illustrate the innovative encoding technique employed for byte transfers of varying lengths.

DETAILED DESCRIPTION

Figure 1:
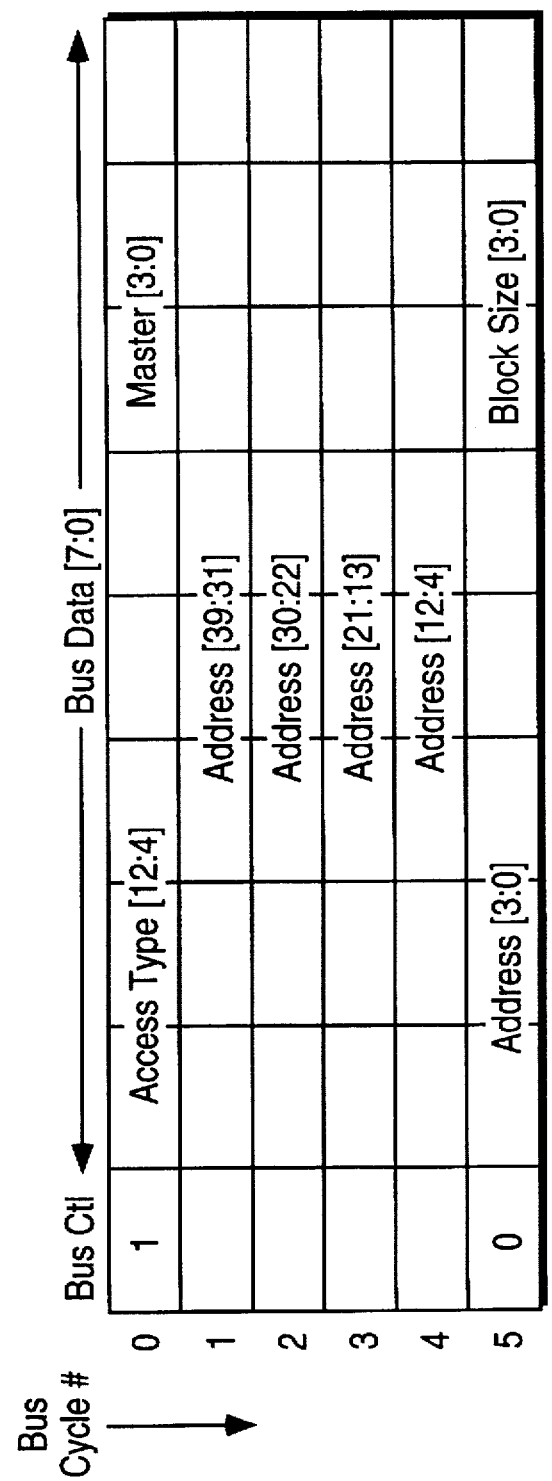
FIG. 1 illustrates a prior art packet format utilized in a high speed bus.
Figure 2:
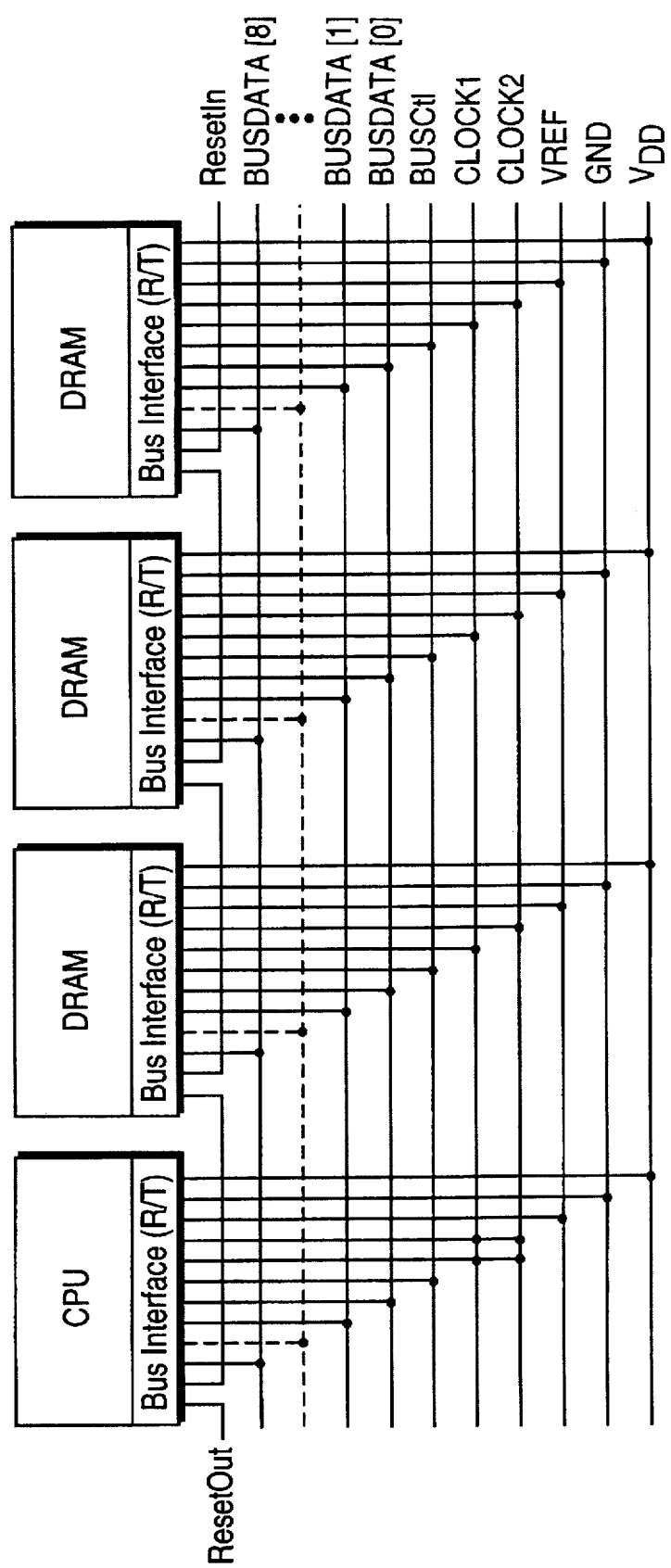
FIG. 2 is a block diagram illustration of an illustrative high speed bus structure.

The request packet format is designed for use on a high speed multiplexed bus for communication between master devices such as processors and slave devices, such as memories and, in particular, dynamic random access memories (DRAMs). The bus carries substantially all address, data and control information needed by the master devices for communication with the slave devices coupled to the bus. The bus architecture includes the following signal transmission lines: BusCtl, BusData [8:0], as well as clock signal lines and power and ground lines. These lines are connected in parallel to each device as illustrated in FIG. 2.

The processors communicate with the DRAMs to read and write data to the memory. The processors form request packets which are communicated to the DRAMs by transmitting the bits on predetermined transmission lines at a predetermined time sequence (i.e., at predetermined clock cycles). The bus interface of the DRAM receiver processes the information received to determine the type of memory request, the address of the memory request and the number of bytes of the transaction. The DRAMs then perform the memory operation indicated by the request packet.

The memory address consists of the row address which is used during the row address strobe (RAS) in the DRAM and the column address which is used during the column address strobe (CAS) in the DRAM. The DRAMs have the capability to operate in normal RAS access mode or in page mode. When operable in page mode, if a subsequent request to access data is directed to the same row, the DRAM does not need to wait for receipt of the row address and to assert RAS, as RAS has been asserted during the previous memory access. Thus, the access time for this data is shortened. For further discussion regarding page mode DRAMs, see Steve L. Gumm, Carl T. Dreher, *Unraveling the Intricacies of Dynamic RAM*, Electronic Design News, pp. 155–165 (Mar. 30, 1989).

The request packet format further helps to improve the performance of the DRAMs in response to memory requests for page mode access. The DRAMs use the lower order portion of the memory address as the column address bits. This provides a locality of reference such that bytes of memory which are logically contiguous will be physically contiguous in the memory space. The resultant effect is that a greater number of logically contiguous bytes of memory are also physically contiguous and the frequency of page mode accesses is increased.

Figure 3:
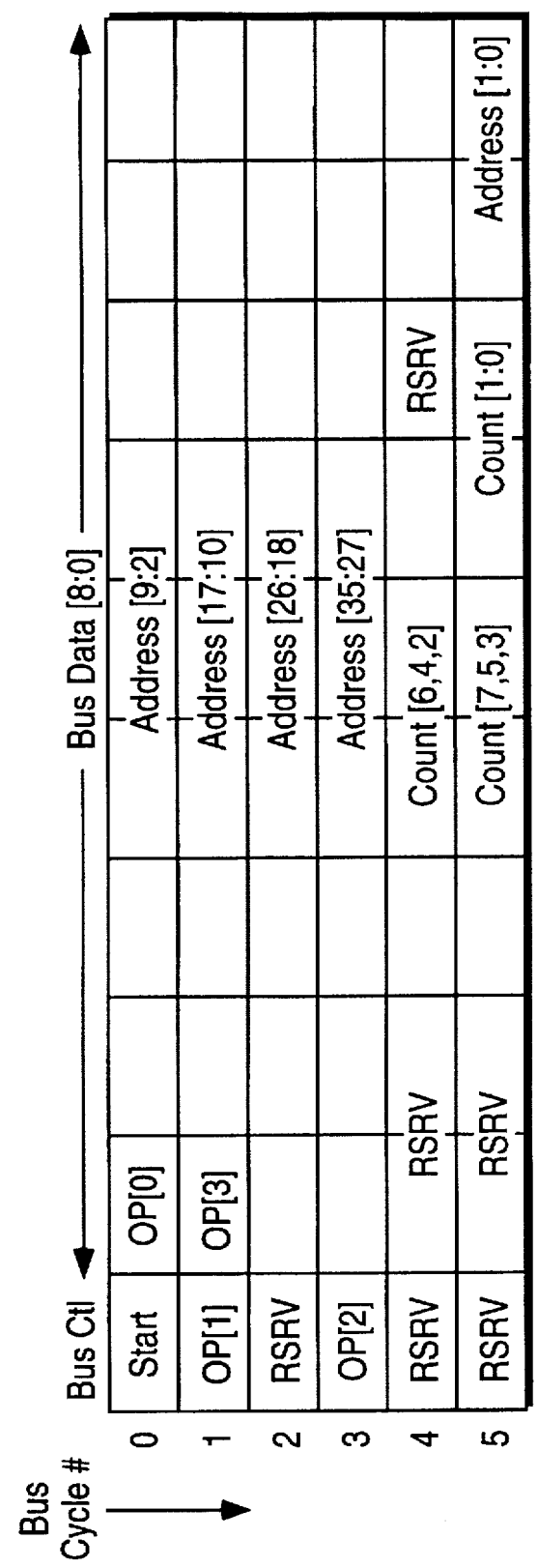
FIG. 3 illustrates a preferred embodiment of the packet format of the present invention.

To further increase the access speed for a memory request, the lower order bits are placed at the beginning of the packet. This is illustrated in FIG. 3, where address bits Address [9:2] are placed in the first word of the packet and bits Address [17:8] are placed in the second word of the packet. By placing the lower order bits at the beginning of the packet, those memory accesses performed in page mode can be processed at least two cycles earlier further increasing the performance of the memory accesses.

As the lower order bits of the memory address are placed in the first two words of the packet, little room is left at the beginning of the packet for op code bits, op[3:0], which identify the type of memory operation to be performed (e.g., page mode access). However, as the memory operation type needs to be determined in order to perform the memory operation, the op code bits need to be transmitted early in the packet. In the packet format of the present invention, the BusCtl line and the most significant bit of the Data signal line, BusData[8], are utilized to transmit the op code bits. The bits are transmitted within the first 4 words of the packet, coincident with the transmission of the memory address. Preferably the memory operation types are coded in such a manner that the bits transmitted coincident with the lower order bits of the memory address indicate whether a page mode memory operation is to be performed.

At bus cycle zero, the BusCtl line is used to indicate the start of the packet.

When multiple devices are transmitting on a bus, the possibility of packet collisions exists. Many different techniques are employed to avoid the concurrent transmission of multiple packets on a bus. For example, the master devices keep track of all pending transactions, so that each master device knows when it can send a request packet and access the corresponding response. However, the master devices will occasionally transmit independent request packets during the same bus cycle. Those multiple requests will collide as each master device drives the bus simultaneously with different information, resulting in scrambled request information. Prior art techniques for detecting and responding to collision detection generally have been found to be too slow for high speed buses. Thus a mechanism for the detection of packet collisions on high speed buses is needed.

Typically two types of collisions will occur: those which are completely aligned in which two or more master devices start transmission at exactly the same cycle, and those which are unaligned in which two or more master devices start transmission at different cycles which are close enough together to cause overlap of the request packets. In PCT international patent application number PCT/US91/02590 filed Apr. 16, 1991, published Oct. 31, 1991, and entitled *Integrated Circuit I/O Using a High Performance Bus Interface*, collisions were detected by the master devices and signals indicating the existence of the collision were subsequently sent by the master devices to the slave devices. This technique requires the master devices to process the detection of a collision and drive the bus to notify the slave devices in a very short period of time. To eliminate need for the master device to notify the slave device of the collision, the master devices and the slave devices detect and process the existence of a collision in parallel.

Additional bits of the packet are preallocated to store a code which identifies the master device transmitting the packet. This is illustrated in the packet format shown in FIG. 4. At bus cycles 4 and 5, the processor device code, Master[3:0] is transmitted. If two master devices issue packet requests starting at the same bus cycle, the master device code, Master[3:0], will be logically ORed together resulting in a different code. This is detected in parallel by the master devices and slave devices which are monitoring the bus signal lines. The slave devices immediately respond by discarding the packets received and an arbitration is performed to determine priority of master device access to the bus for retransmission of the request packets.

Figure 4:
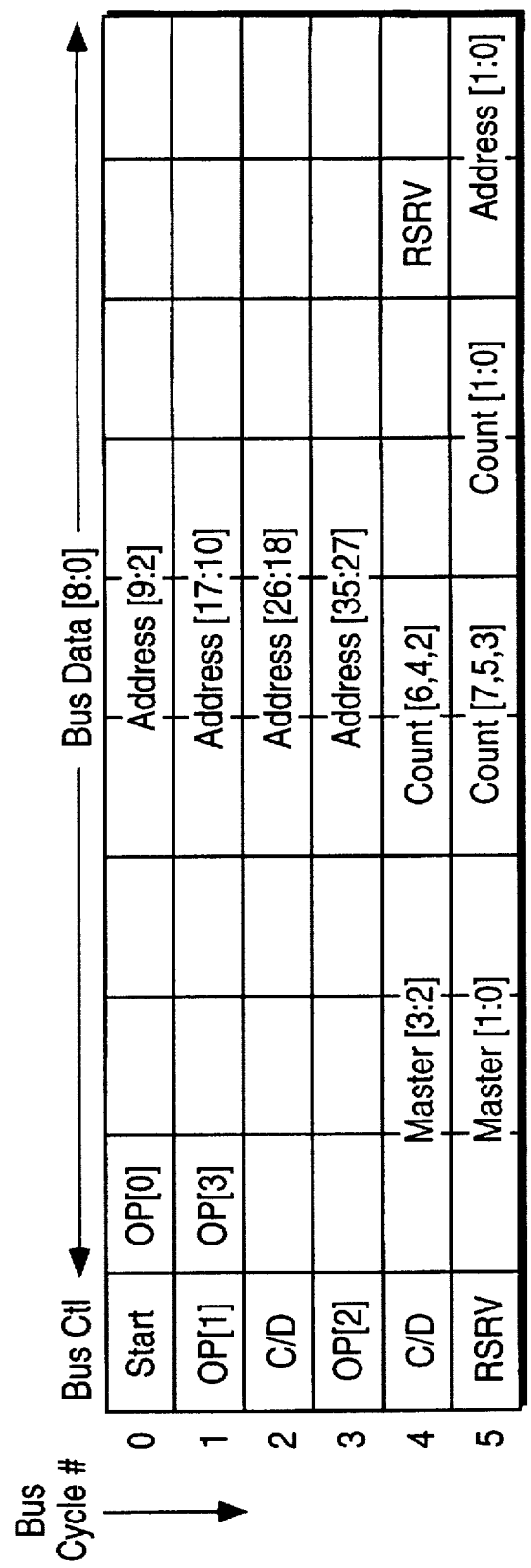
FIG. 4 illustrates another embodiment of the packet format of the present invention in which active collision detection of packets is performed.

An unaligned collision condition arises when a first master device issues a request packet at cycle 0 and a second master device issues a later packet starting, for example, at cycle 2 of the first request packet, thereby overlapping the first request packet. This will occur as the bus operates at high speeds, and the logic in the second master device may not be fast enough to detect a request initiated by the first master at cycle 0 and delay its own request. As the collision occurs during the later clock cycles of the first packet, it is critical that the slave device receiving the request know of the collision before completion of transmission of the request packet so that the packet can be discarded before the slave device responds to the request. The high speed of the bus increases the difficulty of the master device timely notifying the slave device of the occurrence of a collision. Therefore a second innovative collision detection mechanism is used for unaligned collisions. The BusCtl signal line is used at the first bus cycle to indicate the start of a packet. Referring to FIG. 4, BusCtl is now also utilized at predetermined bus cycles for collision detection which increases the speed at which a collision is defected and responded to.

The BusCtl line is monitored by the slave devices as well as the master devices to detect collisions. The BusCtl line at bus cycles at which a subsequent packet may be initiated are normally driven to a low or off state. In the present embodiment, packets are initiated on even clock cycles; therefore the BusCtl line during clock cycles 2 and 4 are normally driven to a low or off state. When a collision occurs, the BusCtl line at one or both cycles will be driven to an on or one state due to the overlap of the data, specifically the start packet signal of a subsequent packet. Both master devices and slave devices monitor BusCtl for information such as the start of the packet. Upon detecting an on or one state at cycles 2 and/or 4, the slave devices immediately know that a collision has occurred and eliminate the packet being received. Thus there is no requirement for the master device to notify the slave device, no delay in responding to a collision and no possibility that the transmission of the packet is completed before the slave device is notified of the collision.

The master devices also monitor the BusCtl signal line for the occurrence of a packet collision. Upon detection of an on state at cycle 2 and/or 4, the transmitting master devices will arbitrate access to the bus and retransmit the packets to ensure accurate transmission of the packets. Thus, the technique described enables the slave devices to immediately detect the occurrence of a collision and discard the packets before the slave devices respond to the requests.

The encoding and decoding of the number of bytes or "count" for a memory operation also plays a significant role in decreasing the latency of processing the transaction. In the high speed bus which utilizes the packet format of the present invention, a balance is achieved between the number of bits required to encode the byte count for the memory transaction and the complexity of logic at the receiver interface of the memory device and the speed of operating the same. Referring to FIG. 3, a total of eight bits are used, Count[7:0]. Although the bits could have been transmitted during the same cycle across parallel transmission lines, the bits have been deliberately organized across two sequential bus cycles and transmitted across adjacent transmission lines. By placing the information on adjacent transmission lines in sequential bus cycles, the amount of wiring required to move the data received in the receiver from the bus input to the receiver logic which determines the count is decreased as there is simply shorter distances between the data inputs. This is illustrated by the block diagrams set forth in FIGS. 5a and 5b.

FIG. 5a is a simplified representation of a physical implementation of a slave device bus interface. In this illustration, count bits [7:2] are transmitted across the bus during one clock cycle on parallel bus lines. The bits are received at the inputs of the bus interface 100, 105, 110, 115, 120 and 125. Once these bits are received, the bits are processed through logic components (not shown) which provide a counter function which counts the number of quadbytes to be transferred. The implementation of this counter requires a carry chain to be built. The decrease in length of the carry chain by placing the count bits on adjacent transmission lines in sequential bus cycles is conceptually illustrated by FIGS. 5a and 5b. The length of the wire 130 needed to form the carry chain for the single clock cycle transmission as shown in FIG. 5a is much greater than the length of wire 135 used to form the carry chain for the bits transmitted sequentially and in parallel as shown in FIG. 5b. The decrease in wire length minimizes the amount of die area required at the receiver and further affects the speed of data along critical paths and thus the latency for decoding the count information.

To simplify the implementation of the receivers of the memory devices as well as reduce the die size of the receiver and decrease the latency for processing bus transactions, data is accessed in the memory in groups of four bytes, referred to herein as "quadbytes". Although the discussion below is directed to the transmission of data in quadbytes, it will be obvious to one skilled in the art from reading the following discussion that the concepts can be extended to any multiple byte organization.

The count bits not only identify the number of bytes to be transmitted starting at the identified memory address, but also the location of the bytes in the quadbyte transmitted. For example, the memory address of the request identifies a location within a quadbyte. To eliminate those bytes not requested, the memory device will mask out the unwanted bytes. The mask is also determined from the count value. In the preferred embodiment, the memory device masks out unwanted bytes during write transactions. During read transactions all bytes of the quadbyte are transferred across the bus. The processor then eliminates those bytes of the first and last quadbyte received which were not requested. This is preferred because this simplifies the implementation of the data path inside the memory devices. For example, in the preferred embodiment, this eliminates the need for a space consuming and time consuming data alignment network to insure proper sequencing of individual bytes. The additional logic that would be required to support the masking and other functions, such as the data alignment network, at the memory devices contributes to increasing the complexity of the chip as well as increasing the die size. However, it should be realized that the memory device can be configured to perform masking operations on both read and write transactions in order to eliminate any unwanted bytes of quadbytes prior to transmission across the bus.

A processor wishing to formulate a memory request will have an internal byte address, MasterAddress[35:0] and an internal byte length, MasterCount[7:0] for the data to be transferred pursuant to the request. Using offset-by-one encoding, the convention used is as follows: MasterCount [7:0]=00000000 indicates one byte and MasterCount[7:0]= 11111111 indicates 256 bytes. The processor converts these internal values into the values for the request packet according to the following:

Address[35:0]=MasterAddress[35:0]

Overflow, Count[7:0]=MasterAddress[1:0]+MasterCount[7:0]

The result of adding MasterAddress[1:0] to MasterCount [7:0] serves several purposes. First, the overflow field indicates to the requesting processor device that although the size of its request is less than the maximum number of bytes allowed in a transaction, the quadbyte granularity does not allow this to occur and the request should be separated into two separate transactions. Second, the sum produces a count of the number of quadbytes to be transmitted in Count[7:2], which is the granularity of the basic data transport units of the bus. Third, it provides an index in Count[1:0] to the last byte to be transported during the last quadbyte of the data packet.

Because the processor supplies the index of the last byte to be transported, the memory device does not need to perform any index arithmetic but instead need only perform a table lookup of the mask data plus a simple logic operation. This reduces the critical path by eliminating the carry chain of the addition. Although the operation is performed by the requesting processor, the processor, unlike the memory device, can typically overlap the addition with other operations such that the effect is minimized. A significant implementation advantage is achieved which simplifies the receiver of the memory devices by performing the addition at the processor. Typically there are more memory devices than processor devices. It is therefore advantageous to decrease the die size and logic complexity in each of the memory devices in exchange for modestly increasing the complexity of the processor devices to perform this functionality.

The bits Address[1:0] and Count[1:0] are used to generate the masks for the first and last quadbytes of the memory request. The masks are used to determine which bytes within a quadbyte are to be read or written. Masks of varying values are generated only for the first and last quadbytes because all the bytes of the intervening quadbytes will be part of the transaction and the masks therefore have a value of 1111. FIGS. 6a and 6b are tables which respectively illustrate the lookup tables for the mapping of Address[1:0] to Mask[3:0] to generate the mask for the first quadbyte, and the mapping of Count[1:0] to Mask[7:4] to generate the mask for the last quadbyte. A value of one in the mask indicates that the byte is one of the bytes of the memory transaction. Mask[3:0] applies to the first quadbyte at Memory[Address][3:0][8:0]. Mask[7:4] applies to the last quadbyte at Memory[Address+Count][3:0][8:0] ([3:0] identifies the byte of the quadbyte and [8:0] identifies the bit of the byte).

FIGS. 7a–7b illustrate masks generated for byte transfers of various sizes. Referring to FIG. 7a, a single byte transfer is described. A single byte transfer is an illustration of a special case where the first and last quadbyte is the same quadbyte. However, the innovative encoding employed accommodates single quadbyte transfers through simple logic operations which result in simple and space saving logic at the receiver. If Count[7:2] is 00000, the offset-by-one encoding indicates that the transfer is a single quadbyte. When count[7:2] equals 00000, Mask[7:4] and Mask[0:3] fields are logically ANDED together to generate the byte mask for the quadbyte.

FIGS. 7b–7d illustrate the masks generated for, respectively, a two byte transfer, a four byte transfer, and an eight byte transfer. The masks are generated by simple logic bit manipulations which permits simple and fast implementation at the receiver. The arrangement of the bits in the packet are specific to this implementation and lends itself to a space efficient implementation of the logic on the chip. The data sizes correspond to a Count[7:0] value of 00000001, 00000011 and 00000111. For each data size, the four combinations of MasterAddress[1:0] (which is equivalent to the value of Address[1:0]) will be shown, in order of values 00, 01, 10, 11. The use of this encoding and placement of the bits in the packet permit a reasonable compromise between the logic complexity in the processor and the complexity in the memory devices.

Specifically, by placing count bits 6, 4, 2 at bus cycle 4 of the packet and count bits 7, 5, 3 at bus cycle 5 of the packet and respectively on the same signal lines as count bits 6, 4, 2, the amount of wiring needed to interconnect the bits with the logic which processes the count bits is decreased. This saving is reflected in the decrease of the die size. In particular, a carry function is utilized to process the count bits. This is simply and efficiently implemented as bits 2 and 3, 4 and 5, 6 and 7, are aligned, eliminating the need to wire for the carry operation between the bits 2 and 3, 4 and 5, 6 and 7.

While the invention has been described in conjunction with the preferred embodiment, it is evident that numerous alternatives, modifications, variations and uses will be apparent to those skilled in the art in light of the foregoing description.

What is claimed is:

1. A method of transmitting digital information, comprising the steps of:
 (a) transmitting a first word of a packet, comprising the steps of:
  (1) transmitting start information onto a first bus, wherein the start information indicates a start of the packet;
  (2) transmitting lower order memory address bits onto a first group of second bus lines;
  (3) transmitting first opcode information onto an Nth bus line of the second bus lines, wherein N is an integer, and wherein the Nth bus line is not a bus line within the first group of the second bus lines;
 (b) transmitting a second word of the packet, comprising the steps of:
  (1) transmitting second op code onto the first bus;
  (2) transmitting higher order memory address bits onto the first group of the second bus lines;
  (3) transmitting third op code information onto the Nth bus line of the second bus lines.

2. The method of claim 1 of transmitting digital information, further comprising the steps of:
 (a) transmitting a third word of a packet, comprising the steps of:
  (1) transmitting a master device code for detecting collisions;
  (2) transmitting count information for determining a count of a number of bytes of a memory transaction.

3. In a digital system comprising a master device and at least one memory device, a process for transmitting memory requests to the memory device comprising the steps of:
 transmitting a first word of a packet, comprising the steps of:
  transmitting start information onto a first bus line, said start information indicating the start of the packet,
  transmitting a first portion of a lower order memory address bits onto a first group of second bus lines, said lower order memory bits comprising information to perform page mode memory accesses, and transmitting a first portion of op code information onto a second group of the second bus lines; and
 transmitting a second word of the packet, comprising the steps of:
  transmitting a second portion of op code information onto the first bus line, transmitting a third portion of op code information onto the second group of the second bus lines, wherein an op code for page mode accesses can be detected from said first, second and third portions of op code information; and
  transmitting a second portion of the lower order memory address bits onto the first group of the second bus lines;
 wherein page mode access can be performed after transmission of the second word of the packet.

4. In a computer system comprising a master device and at least one memory device, a bus system for transmitting memory requests to the memory device comprising:
 a plurality of bus lines for transmission of memory requests;
 a packet comprising a memory request for transmission across the bus lines, said packet comprising:
  a first word comprising:
   start information indicating the start of the packet;
   a first portion of lower order memory address bits comprising information to perform page mode memory accesses; and a first portion of op code information; and a second word comprising:

a second and third portion of op code information, wherein an op code for page mode accesses can be detected from the first, second and third portions of op code information, and a second portion of the lower order memory address bits;

wherein page mode access can be performed after transmission of the second word of the packet.

5. The bus system as set forth in claim 4 wherein said start information is located at a predetermined location in the first word of the packet, said system further comprising:

means for monitoring the predetermined location in each word during transmission of subsequent words of the packet for information other than the start of the packet; and means for detecting a collision if information occurs at the predetermined location in subsequent words of the packet, said information occurring due to the start information of a second packet overlapping the first packet.

6. The bus system as forth in claim 5, wherein said packet further comprises a code identifying the device transmitting the packet, said means for detecting a collision further comprising means for detecting the code to determine where the code is valid, an invalid code resulting from a collision of packets.

7. The bus system as set forth in claim 4, wherein said packet further comprises count information indicating the number of bytes of memory to be transmitted across the bus lines during the memory transaction requested.

8. The bus system as set forth in claim 7, wherein said data is transmitted in a multiple byte block format, said system further comprising:

means for generating a first mask for the first multiple byte block of the data to be transmitted, said mask indicating the bytes of the multiple byte block which are part of the memory operation requested; and means for generating a second mask for the last multiple byte block, said mask indicating the bytes of the last multiple byte block which are part of the memory operation requested.

9. The bus system as set forth in claim 8, wherein data is transmitted in 4 byte blocks, the first mask is generated from the two least significant bits of the address bits and the second mask is generated from the two least significant bits of the count information.

10. The bus system as set forth in claim 8, further comprising a first and second look up table comprising mask patterns, said masks generated by performing a table lookup respectively using the address bits and the count information.

11. The bus system as set forth in claim 4, further comprising a summing means for summing the two least significant address bits and internal byte count to produce an overflow value and count information, said overflow information indicating that although the size of the data of the memory request is less than the maximum number of bytes allowed in the memory operation, the granularity of the multiple byte block format transmitted acres the bus prohibits the transaction and the request should be separated into two separate memory requests.

* * * * *